United States Patent [19]

Hayashi

[11] 4,448,495

[45] May 15, 1984

[54] ZOOM LENS SYSTEM CAPABLE OF VERY CLOSE RANGE PHOTOGRAPHY

[75] Inventor: Kiyoshi Hayashi, Yokohama, Japan
[73] Assignee: Nippon Kogaku K. K., Tokyo, Japan
[21] Appl. No.: 359,436
[22] Filed: Mar. 18, 1982
[30] Foreign Application Priority Data
Mar. 25, 1981 [JP] Japan .................................... 56-43486
[51] Int. Cl.³ ............................................. G02B 15/18
[52] U.S. Cl. .................................................... 350/428
[58] Field of Search ........................ 350/423, 427, 428
[56] References Cited

U.S. PATENT DOCUMENTS 3,661,445 5/1972 Someya ............................... 350/428
3,884,555 5/1975 Suwa et al. .......................... 350/428
4,132,463 1/1979 Sakaguchi et al. .................. 350/428

*Primary Examiner*—John K. Corbin
*Assistant Examiner*—Scott J. Sugarman

*Attorney, Agent, or Firm*—Shapiro and Shapiro

[57] ABSTRACT

A zoom lens system capable of very close range photography comprises, in succession from the object side a convergent first lens group stationary during zooming and moved on the optical axis during focusing, a divergent second lens group which is a variator moved on the optical axis during zooming, a divergent third lens group which is a compensator moved on the optical axis during zooming, and a convergent fourth lens group which is a master lens stationary during zooming. Focusing in a normal photographing distance range is effected by moving the first lens group which is a focusing lens group in the direction of the optical axis. When focusing to an object lying at a shorter distance than the normal photographing distance, all of the first lens group, the second lens group and the third lens group are moved toward the object side in the direction of the optical axis, thereby effecting very close range focusing.

7 Claims, 41 Drawing Figures

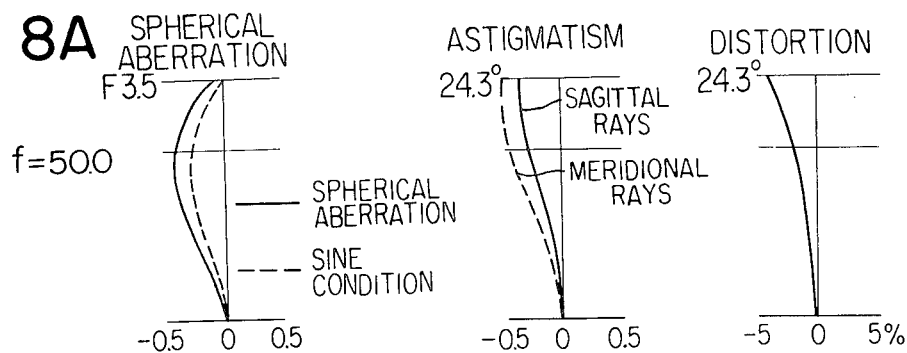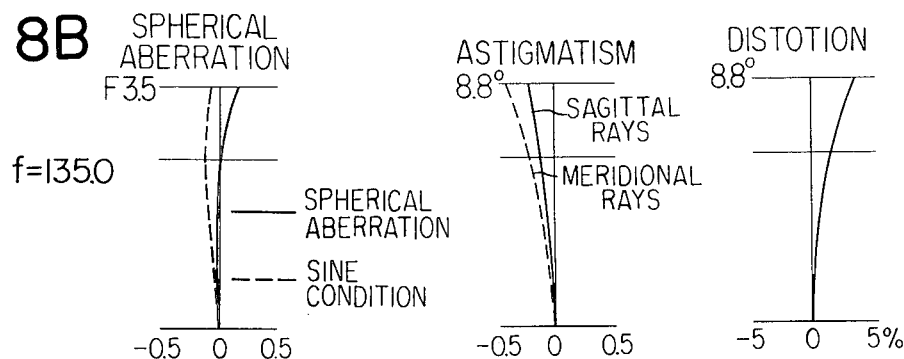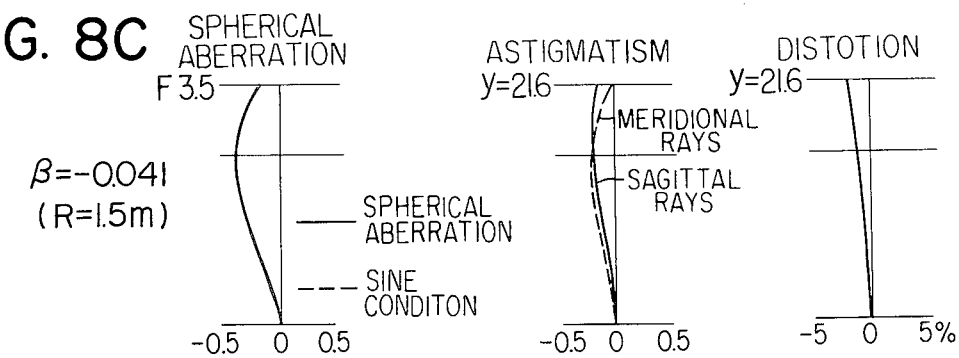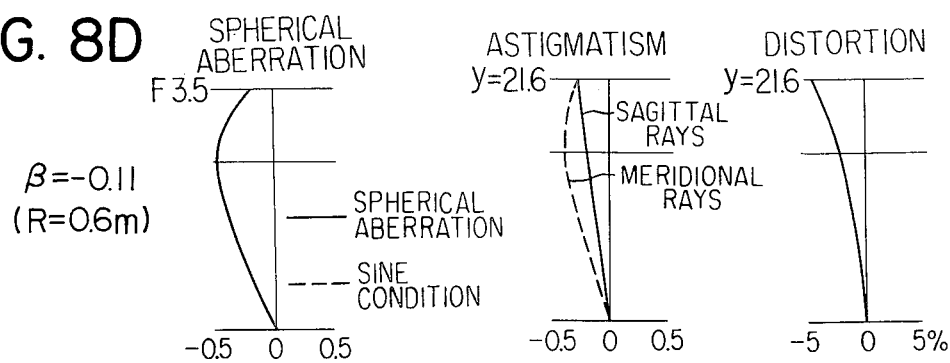

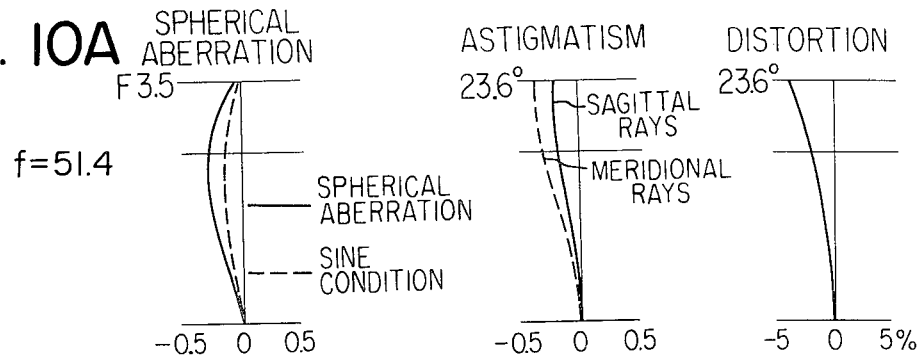
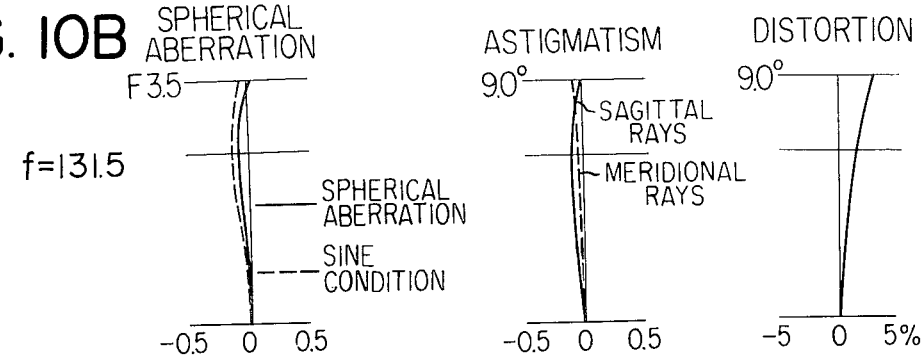
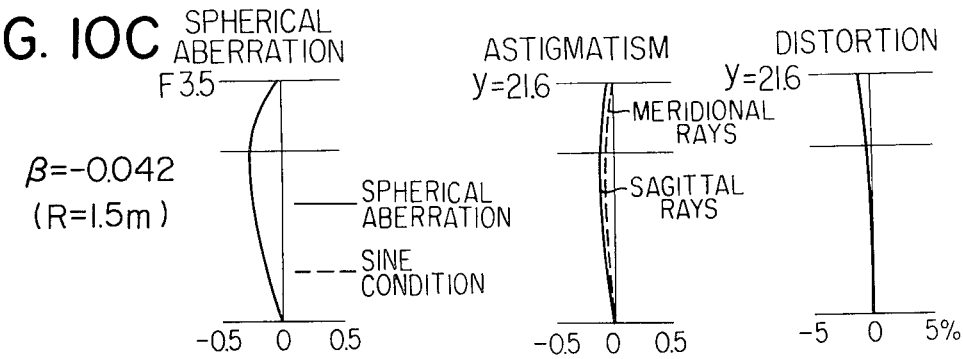
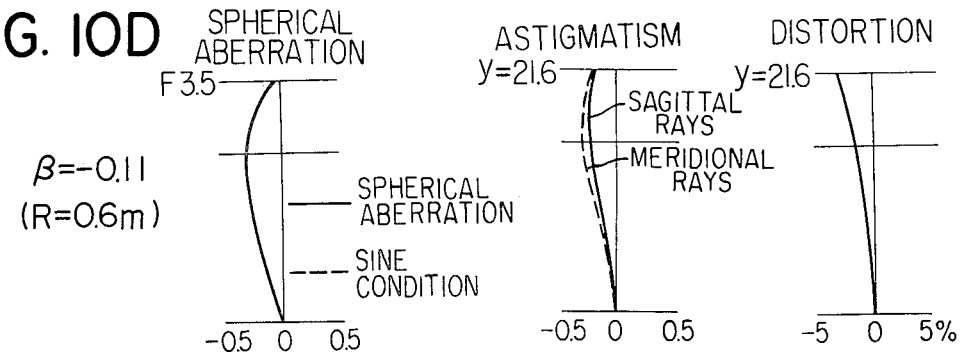

FIG. 12A
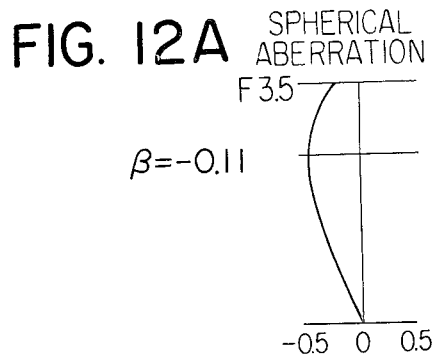
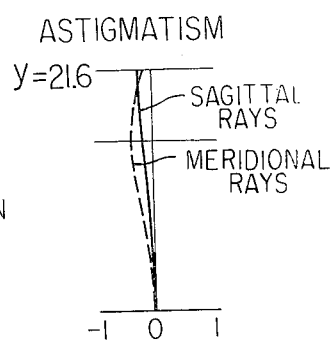
FIG. 12B
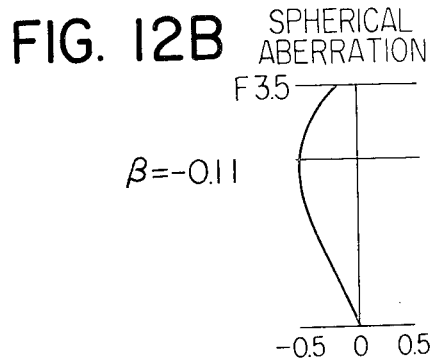
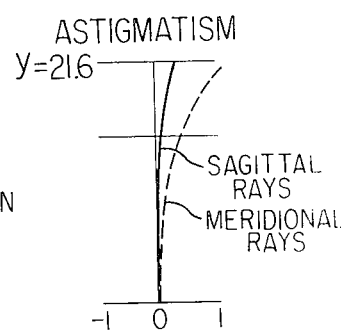
FIG. 12C
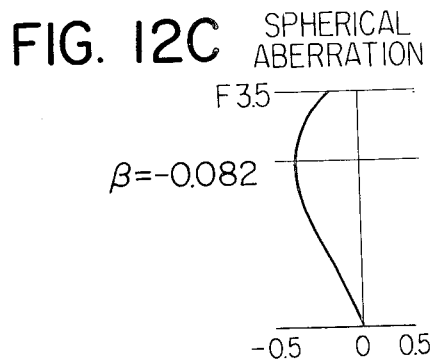
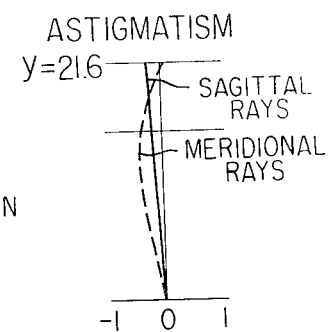
FIG. 12D
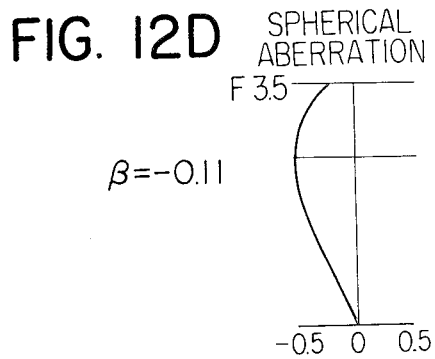
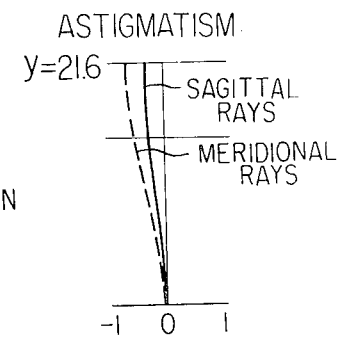

FIG. 13A
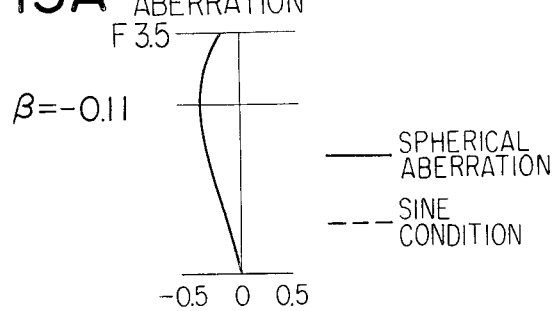
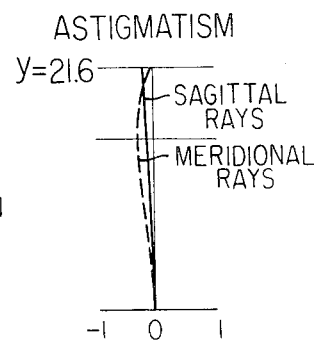
FIG. 13B
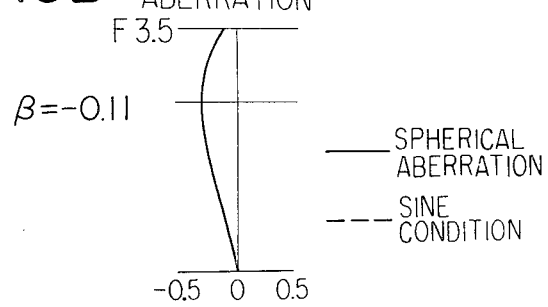
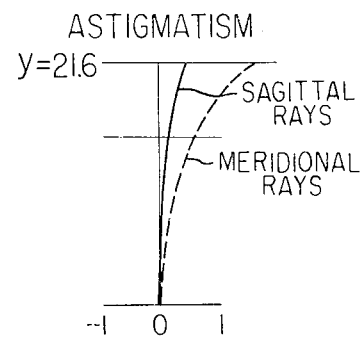
FIG. 13C
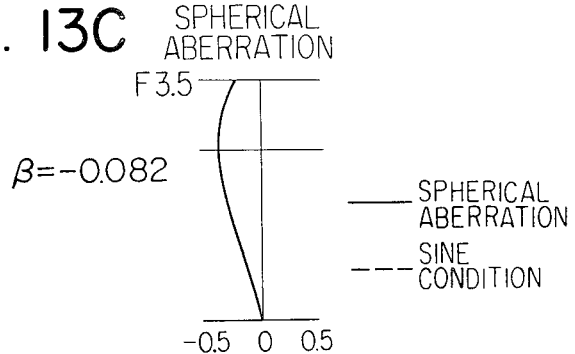
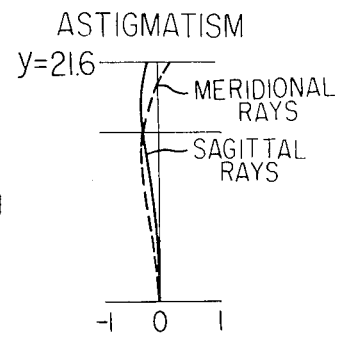
FIG. 13D
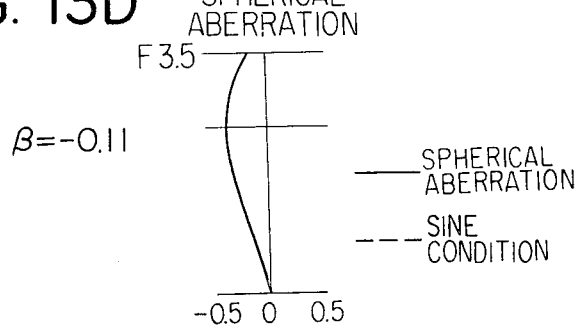
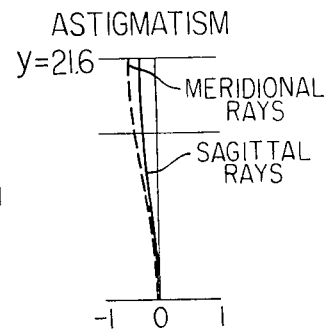

FIG. 14A 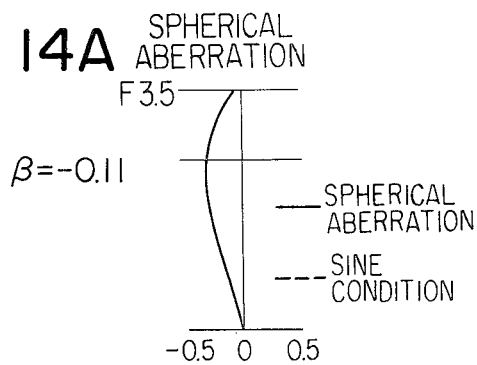 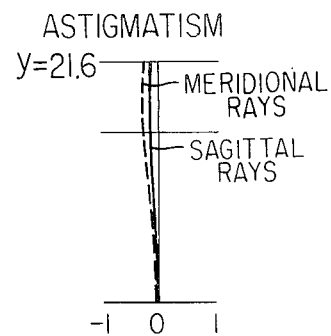
FIG. 14B 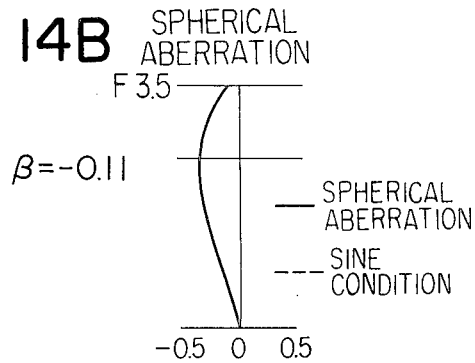 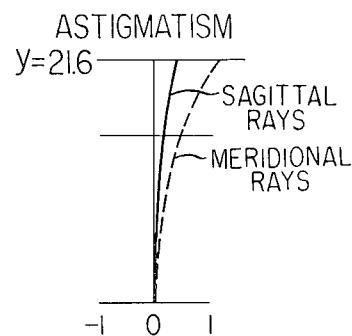
FIG. 14C 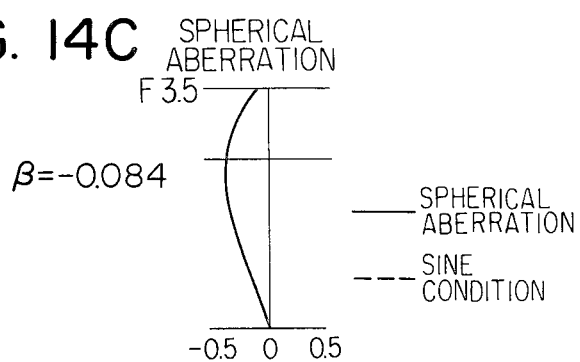 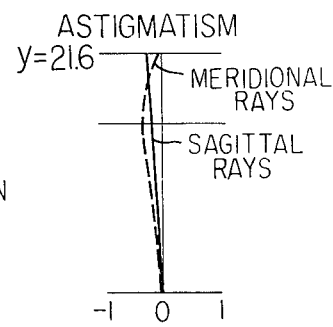
FIG. 14D 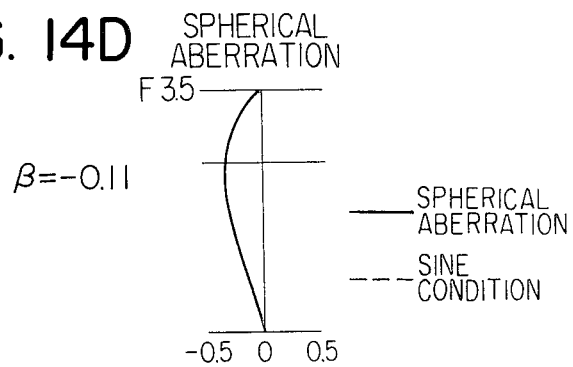 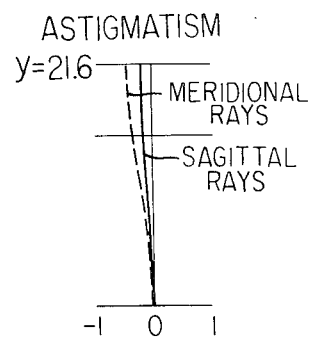

FIG. 15A

SPHERICAL ABERRATION

F 3.5
β=-0.11

— SPHERICAL ABERRATION
--- SINE CONDITION

-0.5  0  0.5

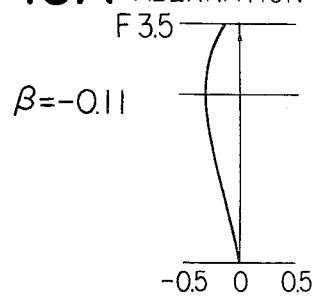

ASTIGMATISM y=21.6
— SAGITTAL RAYS
--- MERIDIONAL RAYS

-1  0  1

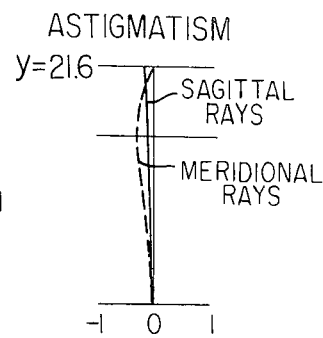

FIG. 15B

SPHERICAL ABERRATION

F 3.5
β=-0.11

— SPHERICAL ABERRATION
--- SINE CONDITION

-0.5  0  0.5

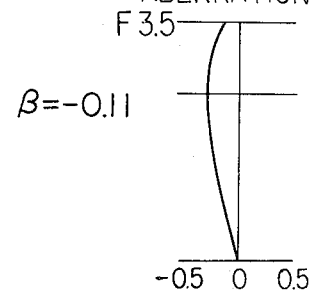

ASTIGMATISM y=21.6
— SAGITTAL RAYS
--- MERIDIONAL RAYS

-1  0  1

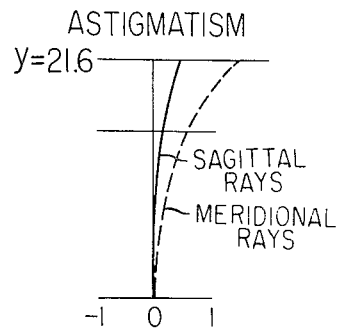

FIG. 15C

SPHERICAL ABERRATION

F 3.5
β=-0.082

— SPHERICAL ABERRATION
--- SINE CONDITION

-0.5  0  0.5

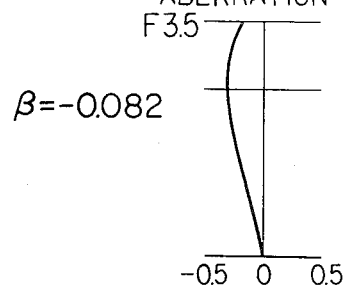

ASTIGMATISM y=21.6
— MERIDIONAL RAYS
--- SAGITTAL RAYS

-1  0  1

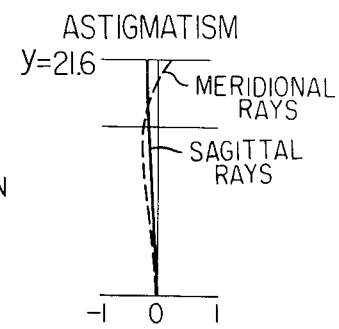

FIG. 15D

SPHERICAL ABERRATION

F 3.5
β=-0.11

— SPHERICAL ABERRATION
--- SINE CONDITION

-0.5  0  0.5

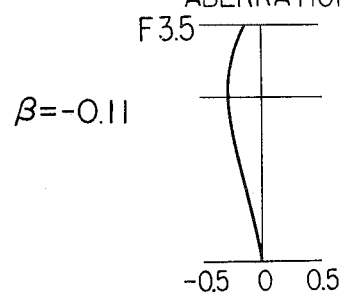

ASTIGMATISM y=21.6
— SAGITTAL RAYS
--- MERIDIONAL RAYS

-1  0  1

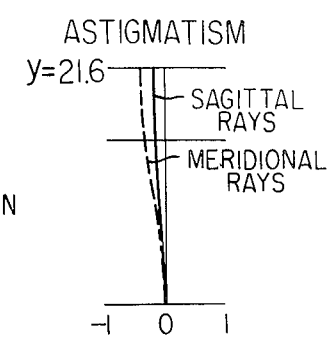
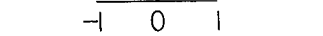

ZOOM LENS SYSTEM CAPABLE OF VERY CLOSE RANGE PHOTOGRAPHY

BACKGROUND OF THE INVENTION

1. Field of the Invention

This invention relates to a zoom lens system capable of very close range photography without aggravating its imaging performance.

2. Description of the Prior Art

A system of moving a first lens group toward the object side has heretofore been adopted as the simplest general focusing system of a zoom lens, but if an attempt is made to greatly reduce the photographing close range by this system, aberrations are of course fluctuated and the position whereat the principal ray passing through the center of a diaphragm intersects the first lens group becomes greatly spaced apart from the optical axis and this results in the increased aperture of the foremost lens which in turn provides a great impediment in making the lens system compact, and thus the close range could only be reduced to a certain degree.

Besides this system of moving the first lens group, various methods of imparting to each group a movement different from the movement by the normal zooming to reduce the close range of the zoom lens have been proposed, but these methods are only of such a degree that a movement different from the movement by the normal zooming is imparted to two groups at most, and an attempt to greatly reduce the close range has greatly destroyed to condition of zooming and has therefore greatly aggravated aberrations and thus, most of these methods have suffered from practical problems unless they are used while being considerably stopped down.

SUMMARY OF THE INVENTION it is an object of the present invention to provide a zoom lens system comprising four positive, negative, negative and positive lens groups in which an increase in the aperture of the foremost lens is prevented to realize a compact lens system and reduction of the photographing distance is realized while very good conditions of aberrations are kept.

The invention will become fully apparent from the following detailed description thereof taken in conjunction with the accompanying drawings.

BRIEF DESCRIPTION OF THE DRAWINGS

FIGS. 8A-8D to 11A-11D illustrate the various aberrations in Embodiments 1-4, A and B of these figures showing the shortest focal length condition and the lengest focal length condition, respectively, during infinity focusing, C showing the case of the normal close range R=1.5 m in the shortest focal length condition, and D showing a case where focusing to an object lying at a shorter distance has been effected according to the present invention.

FIGS. 12A-12D to 15A-15D are aberration graphs for illustrating the effect of the present invention in Embodiments 1-4.

A showing a case where in the shortest focal length condition, the first, second and third groups have all been moved according to the present invention to obtain a magnification $\beta = -0.11$, B showing a case where only the first group has been moved to thereby obtain $\beta = -0.11$, C showing a case where only the second group has been moved to thereby effect focusing to a short distance as far as the spacing from the second group to the first group permits, and D showing a case where only the third group has been moved to thereby obtain $\beta = -0.11$.

DESCRIPTION OF THE PREFERRED EMBODIMENTS

The construction of the present invention consists in a zoom lens system which comprises, in succession from the object side, a convergent first lens group or unit G1 stationary during zooming and moved on the optical axis during focusing, a divergent second lens group or unit G2 which is a variator moved on the optical axis during zooming, a divergent third lens group or unit G3 which is a compensator moved on the optical axis during zooming, and a convergent fourth lens group or unit G4 which is a master lens stationary during zooming and in which the focusing within the normal photographing distance is accomplished by moving the first lens group which is a focusing lens group in the direction of the optical axis and in which when focusing is to be effected to an object at a closer range beyond said normal photographing distance, the first lens group G1 which is a focusing lens group is further moved toward the object side in the direction of the optical axis while, at the same time, the second lens group G2 and the third lens group G3 are moved toward the object side in the direction of the optical axis.

Figure 1:
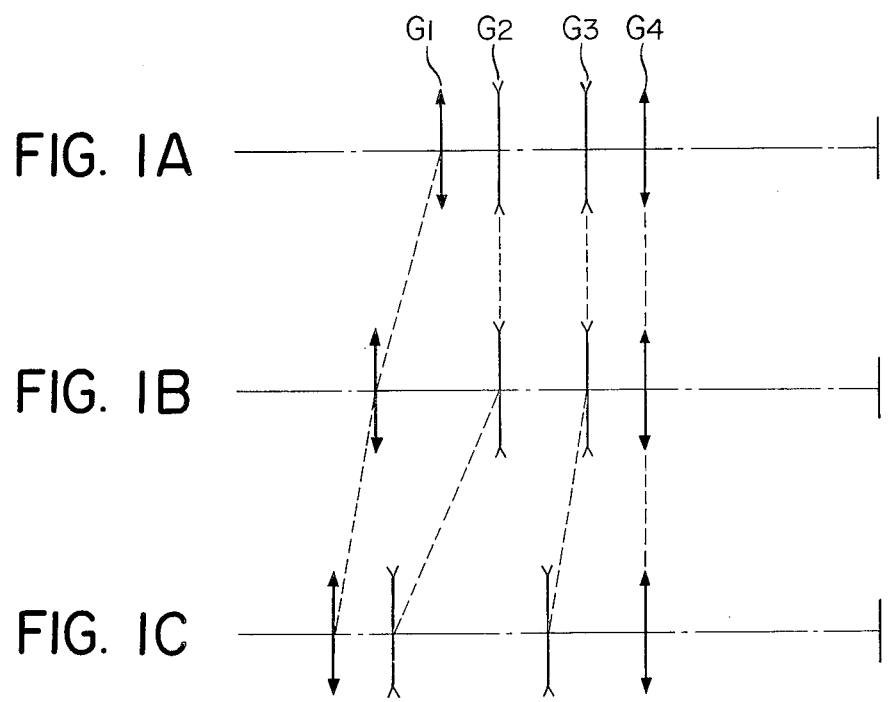
FIGS. 1A-1C show the basic construction the present invention as a Gauss system.

FIGS. 1A, 1B and 1C show such basic constriction of the present invention in the Gauss area. FIG. 1A shows the focused condition to infinity, FIG. 1B shows the focused condition to a normal close range, and FIG. 1C shows the very close range photographing condition.

Figure 2:
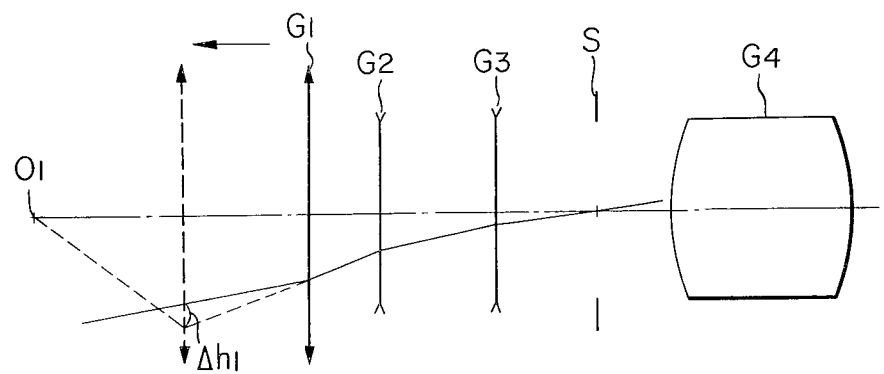
FIGS. 2 and 3 respectively show the increase in the aperture of the foremost lens by movement of a first group and the decrease in the aperture of the foremost lens by movement of a second group, in the Gauss area.

The operation and effect of the present invention will now be described. First, the first lens group G1 is moved toward the object side in the direction of the optical axis from the normal close range focused condition (hereinafter referred to as the reference condition) brought about by movement of the first lens group alone, thereby earning magnification on theextension of the normal focusing. However, the position of the principal ray which intersects this first group G1 is sharply spaced apart from the optical axis and in this condition, the light beam will not sufficiently pass through the first group unless the aperture of the foremost lens is not increased. FIG. 2 shows the manner of increase in the aperture of the foremost lens resulting from the movement of the first group G1 toward the object side. FIG. 2 compares the light path of the principal ray in the infinity focused condition with the light path of the principal ray in the condition in which the first group G1 has been moved toward the object side and focused to an object O₁ at a short distance, and the position of the lens and the light ray both indicated by solid lines refer to the infinity focused condition and the position of the lens and the light ray both indicated by broken lines refer to the short distance focused condition brought about by the movement of the first group G1.

As can be seen from FIG. 2, the aperture must be increased by $\Delta h_1$ by the movement of the first group G1. This movement of the first group also results in a fluctuation of aberrations and in a specific embodiment, particularly curvature of image field greatly increases toward the plus side and this is not preferable.

Figure 3:
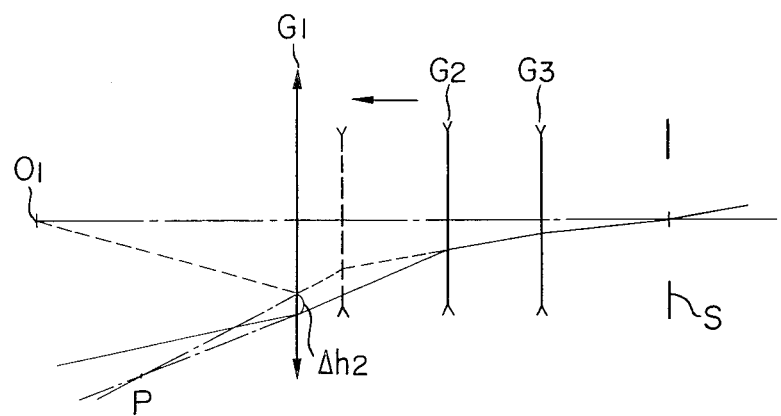
Figure 4:
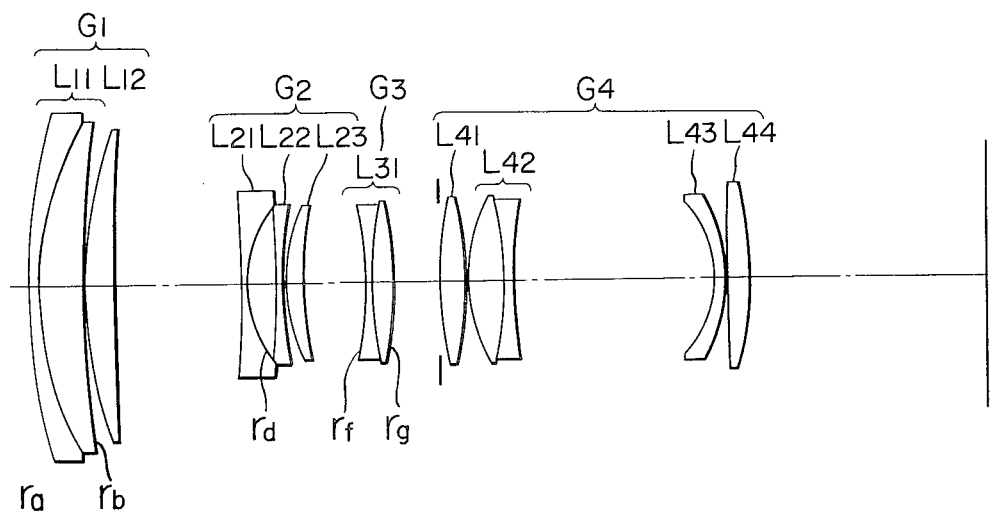
FIGS. 4-7 are cross-sectional views of the lens systems according to Embodiments 1-4.
Figure 5:
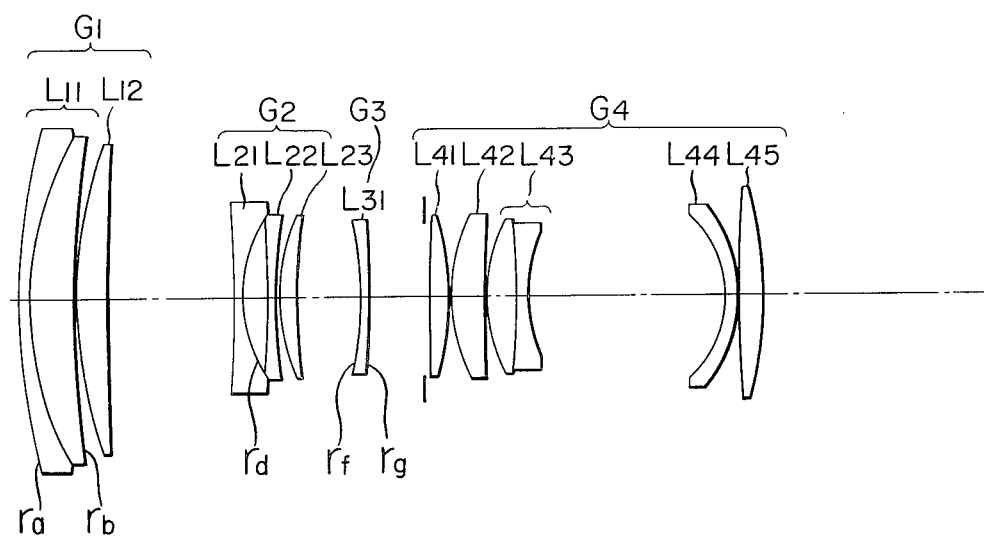
Figure 6:
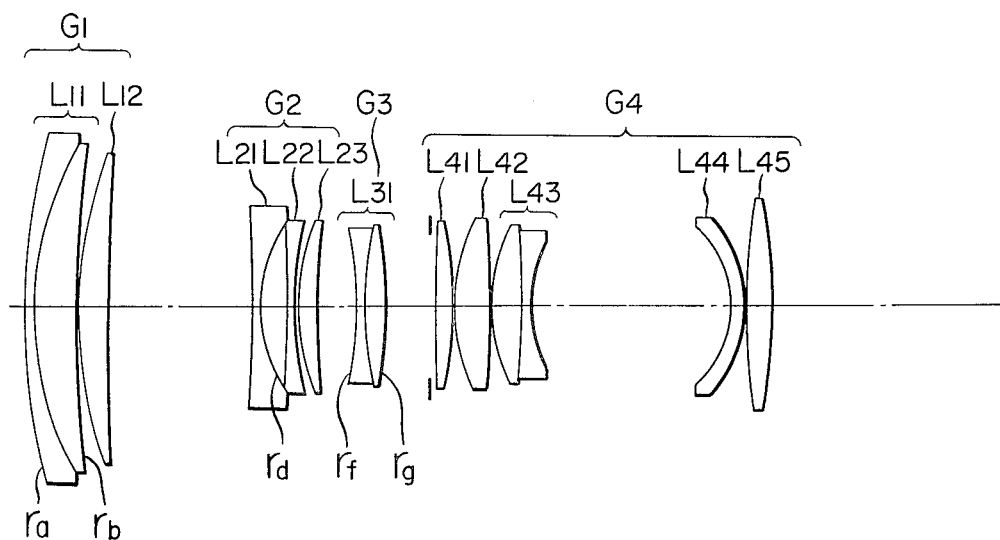
Figure 7:
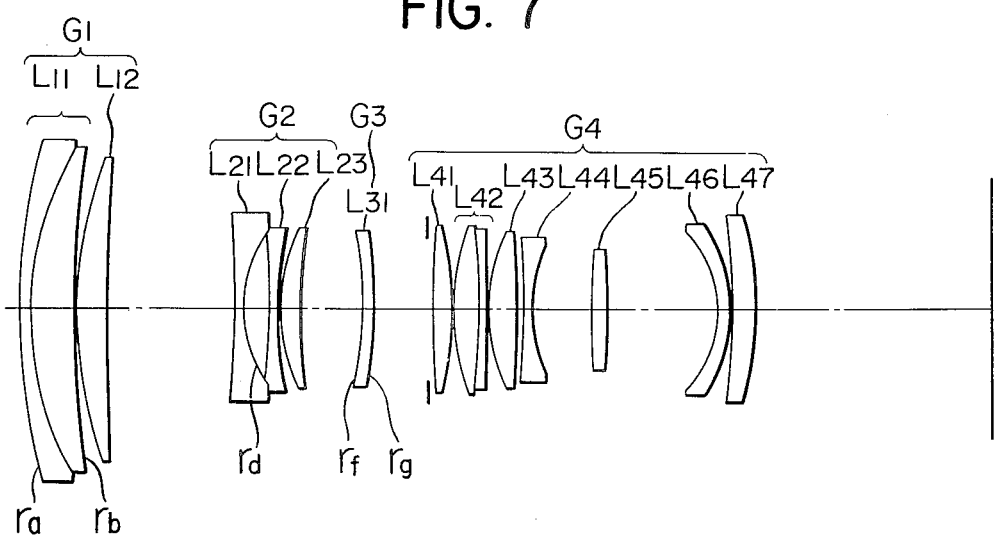
Figure 9A:
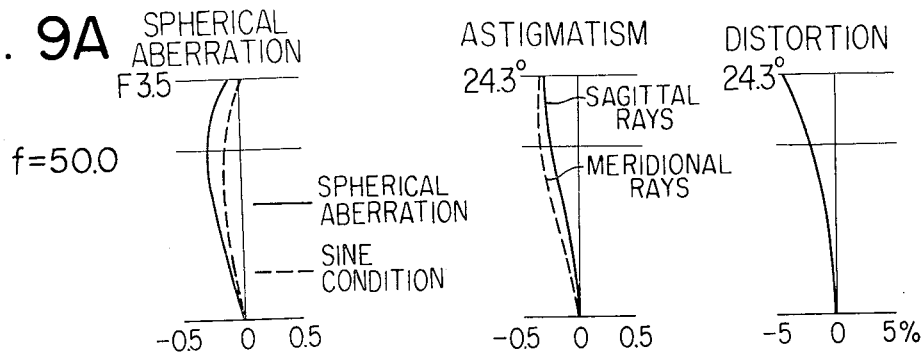
Figure 9B:
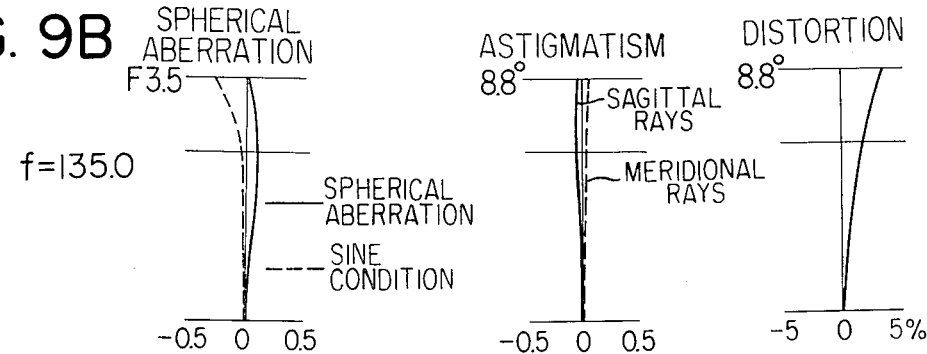
Figure 9C:
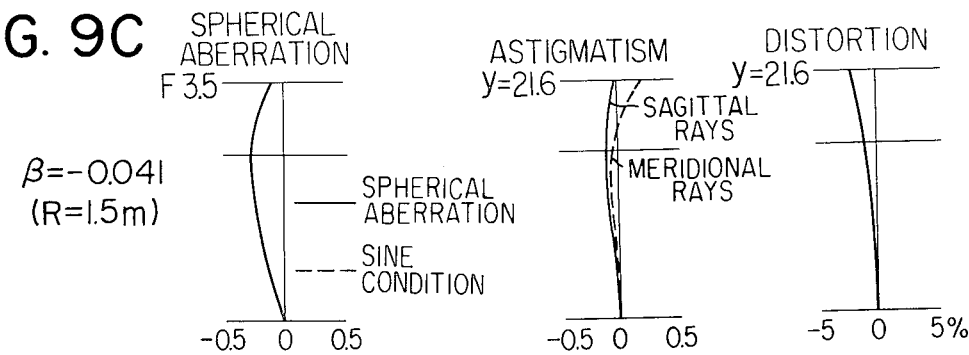
Figure 9D:
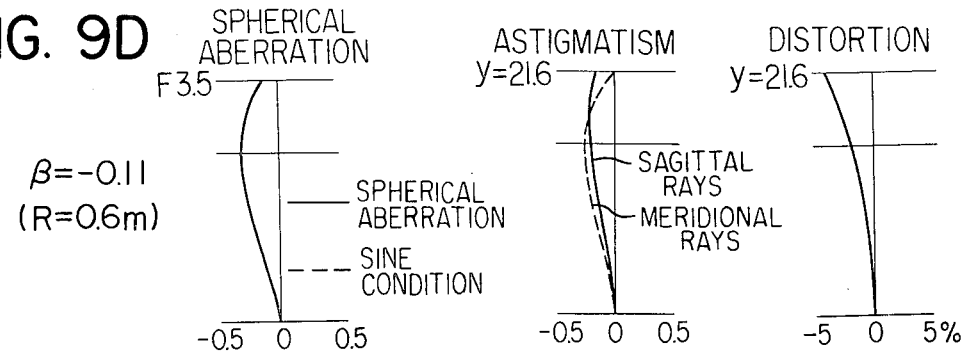
Figure 11A:
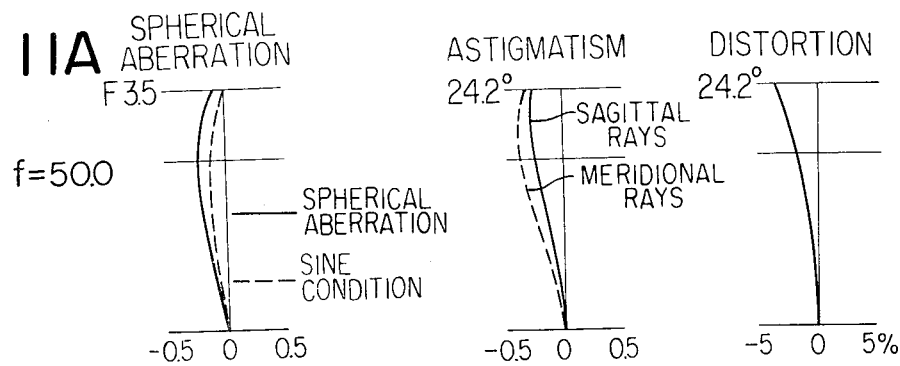
Figure 11B:
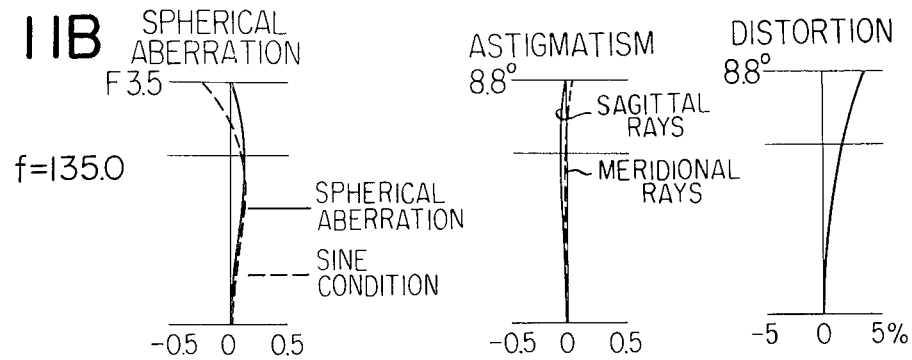
Figure 11C:
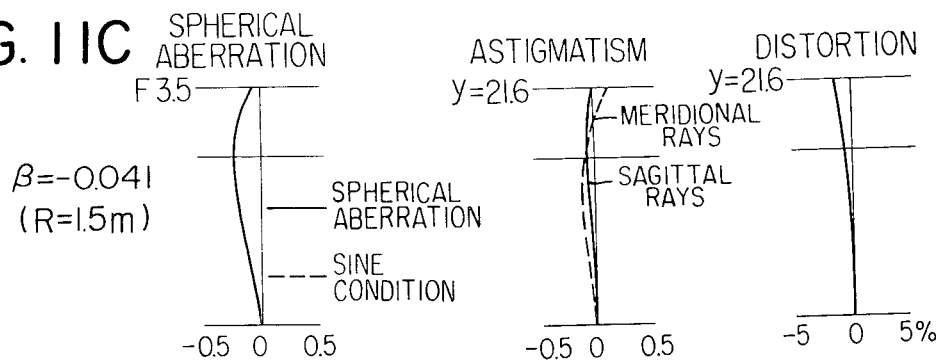
Figure 11D:
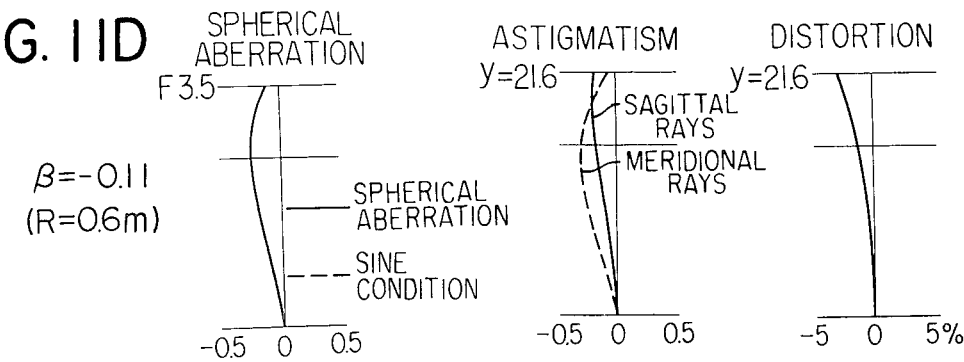

The disadvantage of the focusing by such movement of the first group alone is compensated for by movement of the second group toward the object side. When the second group is moved within a certain degree of range toward the object side on the optical axis, the position of the principal ray which intersects the first group can be made to near the optical axis. This effect is illustrated by FIG. 3. FIG. 3 shows the situation of the principal ray in the infinity condition and the situation of the principal ray in the condition in which only the second group G2 has been moved from said condition toward the object side and focused to an object $O_1$ lying at a short distance, and the position of the lens group and the light ray both indicated by solid lines correspond to the infinity condition and the position of the lens group and the light ray both indicated by broken lines correspond to the condition in which the second lens G2 has been moved. In FIG. 3, when the light rays have been traced from the position of an image side diaphragm S, if movement of the second group G2 is set so that the point of intersection P of the extensions of the light rays after having left the second group in the case of the reference condition and in the case where the second group G2 has been moved lies adjacent to the object side with respect to the first group G1, then the position of the principal ray which intersects the first group G1 can be made to near the optical axis by $\Delta h_2$ as is apparent from the figure and the aperture of the foremost lens can be made smaller. Moreover, the movement of the second group toward the object side has the function of earning magnification and is therefore advantageous to the reduction of the photographing close range.

Finally, by moving the third group G3 toward the object side, magnification can be further earned and at the same time, the plus curvature of image field created by moving the first group G1 can be brought back to minus and good aberrations can be obtained even in the photographing condition of an object lying at a distance further shorter the normal close range.

As described above, all of the first, second and third groups move in the direction for earning magnification and therefore, to obtain the same photographing magnification, the amount of movement of each group may be smaller than in a case where a single group is moved and collapse of aberrations is correspondingly small. Also, by adjusting the amount of movement of each group, the increase in the aperture of the foremost lens is prevented and in addition, each group has the function of mutually negating aberrations and therefore, there can be provided a zoom lens system which can keep a good performance over a wide range from infinity to a very close range and which is compact and high in performance as well as capable of very close range photography.

Next, as the conditions relating to the power arrangement of each group for most enhancing the effect of the present invention and the amount of movement of each group, the zoom lens system should desirably satisfy the following conditions:

$$0.23 < |f_2/f_1| < 0.67 \tag{1}$$

$$0.62 < |f_3/f_1| < 1.19 \tag{2}$$

$$1.5 < x_2'/x_1' < 7.5 \tag{3}$$

$$0.45 < x_3'/x_1' < 2.7 \tag{4}$$

where $x_1'$ is the amount of movement of the first lens group G1 from the reference position in the shortest focal length condition when the lens system is focused to an object lying at a shorter distance beyond the normal photographing distance range, $x_2'$ is the amount of movement of the second lens group G2, for focusing, $x_3'$ is the amount of movement of the third lens group G3, for focusing, $f_1$, $f_2$ and $f_3$ are the focal lengths of the first lens group G1, the second lens group G2 and the third lens group G3, respectively.

When the first, second and third groups assume the power distributions shown in conditions (1) and (2), the best suitable ranges as the amounts of movement of the first, second and third groups for photographing an object lying at a shorter distance than the normal distance are the ranges shown in conditions (3) and (4). If the upper limit of condition (1) is exceeded, the power of the second group relative to the power of the first group will become weak, the Petzval sum will increase in the positive sense, negative curvature of image field will be created and spherical aberration will also increase in the negative sense. Also, to obtain the same zoom ratio, the amount of movement of the second group will be great and this is not preferable in making the lens system compact. On the other hand, if the lower limit of condition (1) is exceeded, the power of the second group relative to the power of the first group will become strong and this is advantageous for making the lens system compact, but the Petzval sum will increase in the negative sense, positive curvature of image field will be created and spherical aberration will also increase in the positive sense.

If the upper limit of condition (2) is exceeded, the power of the third group relative to the power of the first group will become weak and therefore, both spherical aberration and curvature of image field will increase in the negative sense, and if the lower limit of condition (2) exceeded, the power of the third group relative to the power of the first group will become strong and both spherical aberration and curvature of image field will increase in the positive sense.

The optimum aberration structure for each group is determined by such power distribution and, under such aberration structure, the optimum range of the amount of movement of each group for very close range photography is prescribed by conditions (3) and (4). If the upper limit of condition (3) is exceeded, the amount of movement of the second group relative to the amount of movement of the first group will become too great and this greatly contributes to making the aperture of the foremost lens compact, but as regards abberrations, the fluctuation of curvature of image field by image height will become remarkably great. On the other hand, if the lower limit of condition (3) is exceeded, the amount of movement of the second group relative to the amount of movement of the first group will become too small and the increase in the aperture of the foremost lens by the movement of the first group cannot completely be corrected and the effect of the present invention will no longer be created. Also, if the upper limit of condition (4) is exceeded, the amount of movement of the third group relative to the amount of movement of the first group will become great and negative curvature of image field will increase and, if the lower limit of condition (4) is exceeded, the amount of movement of the third group relative to the amount of movement of the first group will become small and the positive curvature of image field created by the movement of the first group cannot completely corrected.

The zoom lens system of the present invention, as described above, also has the effect of short distance correction in aberrations and the aberration structure of each group being moved greatly affects that effect. Therefore, in the construction of the above-described zoom lens according to the present invention, it is desirable for most enhancing the effect of the present invention to constitute the first lens group G1, in succession from the object side, by an achromatic cemented positive lens $L_{11}$ and a positive meniscus single lens $L_{12}$, to constitute the second lens group G2, in succession from the objective side, by a negative single lens $L_{21}$, a negative single lens $L_{22}$ and a positive meniscus single lens $L_{23}$, to constitute the third lens group G3 by a negative achromatic cemented lens or a negative meniscus single lens $L_{31}$, and to satisfy the following conditions:

$$2.2 < (r_b + r_a)/(r_b - r_a) < 2.8 \quad (5)$$

$$1.4 < |f_{rc}/f_{11}| < 1.8 \quad (6)$$

$$0.7 < rd/|f_{21}| < 0.8 \quad (7)$$

$$1.1 < f_{re}/f_{23} < 1.6 \quad (8)$$

$$1.7 < (r_g + r_f)/(r_g - r_f) < 2.8 \quad (9)$$

where $r_a$: radius of curvature of the surface of the cemented positive lens $L_{11}$ in the first lens group G1 which is adjacent to the object side $r_b$: radius of curvature of the surface of the cemented positive lens $L_{11}$ in the first lens group G1 which is adjacent to the image side $f_{rc}$: focal length of the cemented surface of the cemented positive lens $L_{11}$ in the first lens group G1

$f_{11}$: composite focal length of the cemented positive lens $L_{11}$ in the first lens group G1

$r_d$: radius of curvature of the surface of the object side negative lens $L_{21}$ in the second lens group G2 which is adjacent to the image side $f_{21}$: focal length of the object side negative lens $L_{21}$ in the second lens group G2

$f_{re}$: focal length of the surface of the positive meniscus lens $L_{23}$ in the second lens group G2 which is adjacent to the object side $f_{23}$: focal length of the positive meniscus lens $L_{23}$ in the second lens group G2

$r_f$: radius of curvature of the surface of the negative lens $L_{31}$ in the third lens group G3 which is adjacent to the object side $r_g$: radius of curvature of the surface of the negative lens $L_{31}$ in the third lens group which is adjacent to the image side Conditions (5) and (6) are concerned with the construction of the first lens group G1 about the fluctuations of spherical aberration and curvature of image field resulting from zooming and movement of the first group. If the upper limit of condition (5) is exceeded, spherical aberration will increase in the negative sense and particularly the fluctuation at the telephoto end will be great. Curvature of image field will increase in the positive sense at the wide angle end and in the negative sense at the telephoto end, and the fluctuation by zooming will increase. If the lower limit of condition (5) is exceeded, both spherical aberration and curvature of image field will increase with the opposite sign to the case where the upper limit is exceeded. If the upper limit of condition (6) is exceeded, both spherical aberration and curvature of image field will increase in the negative sense. If the lower limit of condition (6) is exceeded, both spherical aberration and curvature of image field will increase with the opposite sign to the case where the upper limit is exceeded. Where the lower limit of condition (6) is exceeded, particularly the fluctuation of curvature of image field increases when the first group has been moved and during infinity focusing and this is not preferable.

Conditions (7) and (8) are concerned with the construction of the second lens group G2 about spherical aberration and curvature of image field. If the upper limit of condition (7) is exceeded, spherical aberration will increase in the negative sense and curvature of image field will increase in the positive sense and particularly the fluctuation of spherical aberration will be so great that it cannot be corrected. If the lower limit of condition (7) is exceeded, both spherical aberration and curvature of image field will increase with the opposite sign to the case where the upper limit is exceeded. If the upper limit of condition (8) is exceeded, both spherical aberration and curvature of image field will increase in the positive sense and the lower coma will greatly increase in the negative sense and symmetry of coma will be destroyed. If the lower limit of condition (8) is exceeded, both spherical aberration and curvature of image field will increase in the negative sense and the lower coma will greatly increase in the positive sense and symmetry of coma will be destroyed so that correction thereof will be impossible.

Condition (9) is concerned with the third lens group G3 about the symmetry of coma. If the upper limit of this condition is exceeded, the lower coma will increase in the negative sense and, if the lower limit of this condition is exceeded, the lower coma will increase in the positive sense. Accordingly, where the range of this condition is exceeded, the symmetry of coma will be greatly destroyed so that correction thereof will be impossible.

By the above-described conditions (5)-(9) being satisfied, the aberration structure of each lens group becomes best and fundamental aberration is kept good and, even when a movement different from normal zooming is imparted to the first, second and third groups for very close range photography, collapse of aberrations is small and thus, good close range photography condition is obtained.

The fourth lens group G4 should desirably comprise a forward group consisting of at least two positive lens and negative lens, and a rearward group consisting of a negative meniscus lens having its convex surface facing the image side and a positive lens having its convex surface of sharper curvature facing the image side, and a positive lens may further be provided between the forward and the rearward group.

Thus, according to the construction of the present invention, as shown in the following embodiments, there can be realized a photographic zoom lens of Leica size (35 mm size) in which the increase in the aperture of the foremost lens is suppressed and compactness is maintained and which has a focal length of 50 mm-135 mm and F-number of the order of 3.5 and has a very good imaging performance even for a very short distance.

The numerical data of some specific embodiments will be shown below. In the tables below, $r_1, r_2, r_3, \ldots$, represent the radii of curvature of the successive lens surfaces from the object side, $d_1, d_2, d_3, \ldots$, represent the center thicknesses and air spaces of the respective lenses, $n_1, n_2, n_3, \ldots$, represent the refractive indices of the respective lenses, and $\nu_1, \nu_2, \nu_3, \ldots$, represent the Abbe number of the respective lenses

| Embodiment 1 |
| --- |
| Total focal length of the entire system: f: 50.0–135.0 |
| Angle of view: $2\omega = 48.6°-17.6°$ F-number: 3.5 |

| | | | | | |
| --- | --- | --- | --- | --- | --- |
| G1 | $r_1 = 120.000$ | $d_1 = 1.752$ | $n_1 = 1.80518$ | $\nu_1 = 25.5$ | $L_{11}$ |
| | $r_2 = 55.327$ | $d_2 = 8.000$ | $n_2 = 1.67790$ | $\nu_2 = 55.5$ | |
| | $r_3 = 280.500$ | $d_3 = 0.103$ | | | |
| | $r_4 = 70.672$ | $d_4 = 5.200$ | $n_3 = 1.67003$ | $\nu_3 = 47.2$ | $L_{12}$ |
| | $r_5 = 475.687$ | $d_5 =$ variable | | | |
| G2 | $r_6 = -628.760$ | $d_6 = 1.290$ | $n_4 = 1.69680$ | $\nu_4 = 55.6$ | $L_{21}$ |
| | $r_7 = 22.563$ | $d_7 = 4.566$ | | | |
| | $r_8 = -266.087$ | $d_8 = 1.191$ | $n_5 = 1.65830$ | $\nu_5 = 57.3$ | $L_{22}$ |
| | $r_9 = 73.045$ | $d_9 = 0.496$ | | | |
| | $r_{10} = 32.767$ | $d_{10} = 2.978$ | $n_6 = 1.80518$ | $\nu_6 = 25.5$ | $L_{23}$ |
| | $r_{11} = 102.146$ | $d_{11} =$ variable | | | |
| G3 | $r_{12} = -45.846$ | $d_{12} = 0.600$ | $n_7 = 1.67025$ | $\nu_7 = 57.5$ | $L_{31}$ |
| | $r_{13} = 104.000$ | $d_{13} = 3.200$ | $n_8 = 1.62230$ | $\nu_8 = 53.1$ | |
| | $r_{14} = -103.464$ | $d_{14} =$ variable | | | |
| G4 | $r_{15} = 87.999$ | $d_{15} = 4.502$ | $n_9 = 1.62299$ | $\nu_9 = 58.1$ | $L_{41}$ |
| | $r_{16} = -54.817$ | $d_{16} = 0.100$ | | | |
| | $r_{17} = 29.301$ | $d_{17} = 6.503$ | $n_{10} = 1.52000$ | $\nu_{10} = 70.1$ | $L_{42}$ |
| | $r_{18} = -62.753$ | $d_{18} = 2.001$ | $n_{11} = 1.79504$ | $\nu_{11} = 28.4$ | |
| | $r_{19} = 139.868$ | $d_{19} = 25.507$ | | | |
| | $r_{20} = -17.098$ | $d_{20} = 2.000$ | $n_{12} = 1.67003$ | $\nu_{12} = 47.2$ | $L_{43}$ |
| | $r_{21} = -26.311$ | $d_{21} = 0.100$ | | | |
| | $r_{22} = -1064.000$ | $d_{22} = 4.000$ | $n_{13} = 1.62280$ | $\nu_{13} = 56.9$ | $L_{44}$ |
| | $r_{23} = -53.091$ | | | | |

| | f = 50.0 | f = 135.0 | Close range photography (R = 0.6 m) |
| --- | --- | --- | --- |
| $d_5$ | 1.762 | 37.798 | 6.450 |
| $d_{11}$ | 32.445 | 3.146 | 35.681 |
| $d_{14}$ | 7.286 | 0.550 | 9.050 |
| Back focal length | 40.454 | 40.454 | 40.454 |

| Embodiment 2 |
| --- |
| Total focal length: f = 50.0–135.0 |
| Angle of view: $2\omega = 48.6°-17.6°$ F-number: 3.5 |

| | | | | | |
| --- | --- | --- | --- | --- | --- |
| G1 | $r_1 = 119.700$ | $d_1 = 1.750$ | $n_1 = 1.80518$ | $\nu_1 = 25.5$ | $L_{11}$ |
| | $r_2 = 55.250$ | $d_2 = 8.000$ | $n_2 = 1.67790$ | $\nu_2 = 55.5$ | |
| | $r_3 = 290.506$ | $d_3 = 0.100$ | | | |
| | $r_4 = 71.202$ | $d_4 = 5.200$ | $n_3 = 1.66672$ | $\nu_3 = 48.4$ | $L_{12}$ |
| | $r_5 = 480.487$ | $d_5 =$ variable | | | |
| G2 | $r_6 = -679.158$ | $d_6 = 1.300$ | $n_4 = 1.69680$ | $\nu_4 = 55.6$ | $L_{21}$ |
| | $r_7 = 22.576$ | $d_7 = 4.550$ | | | |
| | $r_8 = -260.766$ | $d_8 = 1.200$ | $n_5 = 1.65830$ | $\nu_5 = 57.3$ | $L_{22}$ |
| | $r_9 = 72.886$ | $d_9 = 0.500$ | | | |
| | $r_{10} = 32.797$ | $d_{10} = 3.200$ | $n_6 = 1.80518$ | $\nu_6 = 25.5$ | $L_{23}$ |
| | $r_{11} = 102.552$ | $d_{11} =$ variable | | | |
| G3 | $r_{12} = -49.062$ | $d_{12} = 1.200$ | $n_7 = 1.67025$ | $\nu_7 = 57.5$ | $L_{31}$ |
| | $r_{13} = -140.757$ | $d_{13} =$ variable | | | |
| G4 | $r_{14} = 520.300$ | $d_{14} = 3.200$ | $n_8 = 1.62230$ | $\nu_8 = 53.1$ | $L_{41}$ |
| | $r_{15} = -47.860$ | $d_{15} = 0.100$ | | | |
| | $r_{16} = 37.413$ | $d_{16} = 6.000$ | $n_9 = 1.51454$ | $\nu_9 = 54.6$ | $L_{42}$ |
| | $r_{17} = 765.579$ | $d_{17} = 0.100$ | | | |
| | $r_{18} = 24.293$ | $d_{18} = 5.500$ | $n_{10} = 1.51823$ | $\nu_{10} = 59.0$ | $L_{43}$ |
| | $r_{19} = -248.661$ | $d_{19} = 2.000$ | $n_{11} = 1.79504$ | $\nu_{11} = 28.4$ | |
| | $r_{20} = 28.696$ | $d_{20} = 35.000$ | | | |
| | $r_{21} = -17.690$ | $d_{21} = 2.000$ | $n_{12} = 1.67003$ | $\nu_{12} = 47.2$ | $L_{44}$ |
| | $r_{22} = -24.516$ | $d_{22} = 0.100$ | | | |
| | $r_{23} = 248.760$ | $d_{23} = 4.500$ | $n_{13} = 1.62280$ | $\nu_{13} = 56.9$ | $L_{45}$ |
| | $r_{24} = -58.913$ | | | | |

Close range photography

-continued

Embodiment 2

|  | f = 50.0 | f = 135.0 | (R = 0.6 m) |
|---|---|---|---|
| $d_5$ | 1.708 | 37.706 | 6.488 |
| $d_{11}$ | 32.697 | 3.338 | 35.699 |
| $d_{13}$ | 9.198 | 2.559 | 10.997 |
| Back focal length | 40.073 | 40.073 | 40.073 |

Embodiment 3

Total focal length: f = 51.35–131.5
Angle of view: $2\omega$ = 47.2°–18.1°  F-number: 3.5

| | | | | |
|---|---|---|---|---|
| G1 | $r_1$ = 109.108 | $d_1$ = 1.700 | $n_1$ = 1.80518 $\nu_1$ = 25.5 | $L_{11}$ |
| | $r_2$ = 52.045 | $d_2$ = 7.700 | $n_2$ = 1.67790 $\nu_2$ = 55.5 | |
| | $r_3$ = 271.045 | $d_3$ = 0.100 | | |
| | $r_4$ = 73.746 | $d_4$ = 5.000 | $n_3$ = 1.66672 $\nu_3$ = 48.4 | $L_{12}$ |
| | $r_5$ = 669.887 | $d_5$ = variable | | |
| G2 | $r_6$ = −596.840 | $d_6$ = 1.250 | $n_4$ = 1.69680 $\nu_4$ = 55.6 | $L_{21}$ |
| | $r_7$ = 23.177 | $d_7$ = 5.000 | | |
| | $r_8$ = −187.747 | $d_8$ = 1.150 | $n_5$ = 1.78797 $\nu_5$ = 47.5 | $L_{22}$ |
| | $r_9$ = 80.762 | $d_9$ = 0.500 | | |
| | $r_{10}$ = 36.040 | $d_{10}$ = 3.100 | $n_6$ = 1.80518 $\nu_6$ = 25.5 | $L_{23}$ |
| | $r_{11}$ = 178.634 | $d_{11}$ = variable | | |
| G3 | $r_{12}$ = −48.836 | $d_{12}$ = 1.150 | $n_7$ = 1.67025 $\nu_7$ = 57.5 | $L_{31}$ |
| | $r_{13}$ = 88.471 | $d_{13}$ = 2.950 | $n_8$ = 1.67163 $\nu_8$ = 38.8 | |
| | $r_{14}$ = −145.230 | $d_{14}$ = variable | | |
| G4 | $r_{15}$ = 644.641 | $d_{15}$ = 3.25 | $n_9$ = 1.62041 $\nu_9$ = 60.35 | $L_{41}$ |
| | $r_{16}$ = −54.649 | $d_{16}$ = 0.100 | | |
| | $r_{17}$ = 39.937 | $d_{17}$ = 6.100 | $n_{10}$ = 1.51823 $\nu_{10}$ = 59.0 | $L_{42}$ |
| | $r_{18}$ = −366.908 | $d_{18}$ = 0.100 | | |
| | $r_{19}$ = 22.847 | $d_{19}$ = 5.600 | $n_{11}$ = 1.51823 $\nu_{11}$ = 59.0 | $L_{43}$ |
| | $r_{20}$ = −274.443 | $d_{20}$ = 2.000 | $n_{12}$ = 1.79504 $\nu_{12}$ = 28.4 | |
| | $r_{21}$ = 27.085 | $d_{21}$ = 35.550 | | |
| | $r_{22}$ = −17.440 | $d_{22}$ = 2.000 | $n_{13}$ = 1.67003 $\nu_{13}$ = 47.2 | $L_{44}$ |
| | $r_{23}$ = −23.786 | $d_{23}$ = 0.100 | | |
| | $r_{24}$ = 119.773 | $d_{24}$ = 4.550 | $n_{14}$ = 1.61720 $\nu_{14}$ = 54.0 | $L_{45}$ |
| | $r_{25}$ = −81.958 | | | |

| | f = 51.4 | f = 131.5 | Close range photography (R = 0.6 m) |
|---|---|---|---|
| $d_5$ | 3.496 | 35.967 | 7.276 |
| $d_{11}$ | 27.945 | 3.069 | 31.396 |
| $d_{14}$ | 9.661 | 2.065 | 11.510 |
| Back focal length | 40.003 | 40.003 | 40.003 |

Embodiment 4

Total focal length: f = 50.0–135.0
Angle of view: $2\omega$ = 48.4°–17.5°  F-number: 3.5

| | | | | |
|---|---|---|---|---|
| G1 | $r_1$ = 117.081 | $d_1$ = 1.750 | $n_1$ = 1.80518 $\nu_1$ = 25.5 | $L_{11}$ |
| | $r_2$ = 54.849 | $d_2$ = 8.000 | $n_2$ = 1.67790 $\nu_2$ = 55.5 | |
| | $r_3$ = 282.548 | $d_3$ = 0.100 | | |
| | $r_4$ = 72.149 | $d_4$ = 5.200 | $n_3$ = 1.66672 $\nu_3$ = 48.4 | $L_{12}$ |
| | $r_5$ = 501.276 | $d_5$ = variable | | |
| G2 | $r_6$ = −651.355 | $d_6$ = 1.300 | $n_4$ = 1.69680 $\nu_4$ = 55.6 | $L_{21}$ |
| | $r_7$ = 22.627 | $d_7$ = 4.550 | | |
| | $r_8$ = −236.588 | $d_8$ = 1.200 | $n_5$ = 1.65830 $\nu_5$ = 57.3 | $L_{22}$ |
| | $r_9$ = 73.295 | $d_9$ = 0.500 | | |
| | $r_{10}$ = 33.063 | $d_{10}$ = 3.200 | $n_6$ = 1.80518 $\nu_6$ = 25.5 | $L_{23}$ |
| | $r_{11}$ = 107.604 | $d_{11}$ = variable | | |
| G3 | $r_{12}$ = −49.390 | $d_{12}$ = 1.200 | $n_7$ = 1.67025 $\nu_7$ = 57.5 | $L_{31}$ |
| | $r_{13}$ = −143.455 | $d_{13}$ = variable | | |
| | $r_{14}$ = 302.318 | $d_{14}$ = 3.200 | $n_8$ = 1.71700 $\nu_8$ = 47.9 | $L_{41}$ |
| | $r_{15}$ = −56.420 | $d_{15}$ = 0.100 | | |
| | $r_{16}$ = 42.090 | $d_{16}$ = 5.000 | $n_9$ = 1.57250 $\nu_9$ = 46.2 | $L_{42}$ |
| | $r_{17}$ = −91.578 | $d_{17}$ = 1.000 | $n_{10}$ = 1.79631 $\nu_{10}$ = 40.8 | |
| | $r_{18}$ = 282.945 | $d_{18}$ = 0.100 | | |
| | $r_{19}$ = 25.063 | $d_{19}$ = 5.500 | $n_{11}$ = 1.51823 $\nu_{11}$ = 59.0 | $L_{43}$ |

-continued

| Embodiment 4 | | | | | |
|---|---|---|---|---|---|
| G4 | $r_{20} = -457.824$  $d_{20} = 1.000$ | | | | |
| | $r_{21} = -361.839$  $d_{21} = 2.000$ | $n_{12} = 1.79504$ | $\nu_{12} = 28.4$ | $L_{44}$ | |
| | $r_{22} = 30.961$  $d_{22} = 10.000$ | | | | |
| | $r_{23} = 165.161$  $d_{23} = 3.000$ | $n_{13} = 1.51680$ | $\nu_{13} = 64.2$ | $L_{45}$ | |
| | $r_{24} = -133.734$  $d_{24} = 19.764$ | | | | |
| | $r_{25} = -17.944$  $d_{25} = 2.000$ | $n_{14} = 1.67003$ | $\nu_{14} = 47.2$ | $L_{46}$ | |
| | $r_{26} = -26.804$  $d_{26} = 0.100$ | | | | |
| | $r_{27} = -180.359$  $d_{27} = 4.500$ | $n_{15} = 1.66755$ | $\nu_{15} = 41.9$ | $L_{47}$ | |
| | $r_{28} = -49.376$ | | | | |

| | $f = 50.0$ | $f = 135.0$ | Close range photography ($R = 0.6$ m) |
|---|---|---|---|
| $d_5$ | 1.673 | 37.672 | 6.353 |
| $d_{11}$ | 32.651 | 3.292 | 35.910 |
| $d_{13}$ | 9.207 | 2.567 | 10.948 |
| Back focal length | 40.000 | 40.000 | 40.000 |

In the close range photography condition in each of the embodiments shown above, the distance R=1.5 m from the object to be photographed to the film surface as the normal close range in the shortest focal length condition is the standard, and said predetermined amounts of movement are imparted to the first, second and third lens groups from this condition to thereby obtain a magnification $\beta = -0.11$ times (R=0.6 m).

The lens constructions of Embodiments 1, 2, 3 and 4 are illustrated in FIGS. 4, 5, 6 and 7, respectively.

To make it readily understood that the aperture of the foremost lens of the zoom lens system is made small by the present invention, the position of the principal ray having a maximum angle of view in the tangential plane of the surface of the first group in each of the above-described embodiments which is most adjacent to the object side will be shown in Table 1 below with respect to three cases. Any of the three cases is in the shortest focal length condition. The first case is a case of normal close range photography where the distance from the object to the image plane is R=1.5 m, the second case is a case of photographing magnification $\beta = -0.11$ where focusing to an object lying at a shorter distance than the normal close range is effected by only movement of the first group, and the third case is a case by the focusing system of the present invention where all the first, second and third groups are moved to obtain a photographing magnification $\beta = -0.11$ as in the second case.

TABLE 1

| | Embodiment 1 | Embodiment 2 | Embodiment 3 | Embodiment 4 |
|---|---|---|---|---|
| Normal close range $\beta \approx -0.04$ (R = 1.5 m) | −25.82 | −25.90 | −26.14 | −25.71 |
| By only the first group $\beta = -0.11$ | −35.16 | −35.28 | −34.55 | −35.04 |
| By the system of the invention $\beta = -0.11$ | −25.89 | −25.98 | −26.20 | −25.78 |

It is seen from Table 1 that in each of the embodiments, if the focusing system of the present invention is adopted, even if focusing is effected to an object lying at a shorter distance than the normal close range, the position whereat the principal ray having a maximum angle of view is incident on the lens surface which is most adjacent to the object side is kept equivalent to that in the normal case and the aperture of the foremost lens is maintained small.

The aberrations in the respective embodiments are shown in FIGS. 8A-8D to 11A-11D. In each of these figures, A and B respectively show the shortest focal length condition and the longest focal length condition during the infinity focusing, C shows the case of the normal close range F=1.5 m in the shortest focal length condition, and D shows a case where focusing has been effected to an object lying at a further shorter distance by the present invention. From comparison of these aberration graphs, it will be seen that in any of the embodiments, an aberration balance equivalent to infinity is maintained for an object lying at a shorter distance than the normal close range and particularly, the improvement in astigmatism is remarkable. It is thus apparent that a very good imaging performance is maintained by the present invention.

For reference, a case where the focusing system of the present invention has been used and cases where the first, second and third groups have been independently moved to effect focusing are shown in FIGS. 12A-12D to 15A-15D with respect to the spherical aberration and astigmatism in the respective embodiments. In each of these figures, A shows a case where in the shortest focal length condition, the first, second and third groups have all been moved according to the present invention to obtain a magnification $\beta = -0.11$, B shows a case where only the first group has been moved to thereby obtain $\beta = -0.11$, C shows a case where only the second group has been moved to thereby effect focusing to a short distance as far as the spacing from the second group to the first group permits, and D shows a case where only the third group has been moved to thereby obtain $\beta = -0.11$. It will be seen from these aberration graphs that if any of the first, second and third groups is independently moved, particularly deterioration of astigmatism is unavoidable and astigmatism can be well corrected only by the cooperative focusing of the three groups according to the present invention.

Any of the examples shown in the aberration graphs has been a case where focusing to an object lying at a shorter distance than the normal close range has been effected in the shortest focal length condition (wide angle end) by zooming, whereas this is not restrictive but of course, even in the longest focal length condition (telephoto end), focusing to an object lying at a distance shorter than before can be accomplished by a similar focusing system.

As has been described above, according to the present invention, there has been achieved a zoom lens having a very excellent imaging performance while maintaining the aperture of the foremost lens very compact even for photography of an object lying at a shorter distance than the normal close range.

I claim:

1. A zoom lens system capable of very close range photography and comprising, in succession from the object side, a convergent first lens unit stationary during zooming and moved on the optical axis during focusing, a divergent second lens unit which is a variator moved on the optical axis during zooming, a divergent third lens unit which is a compensator moved on the optical axis during zooming, and a convergent fourth lens unit which is a master lens stationary during zooming, and wherein focusing in a normal photographing distance range is effected by moving said first lens unit which is a focusing lens unit in the direction of the optical axis, characterized in that when focusing to an object lying at a shorter distance than said normal photographing distance, all of said first lens unit, said second lens unit and said third lens unit are moved toward the object side in the direction of the optical axis, thereby effecting very close range focusing, said system satisfying the following conditions:

$$0.23 < |f_2/f_1| < 0.67 \tag{1}$$

$$0.62 < |f_3/f_1| < 1.19 \tag{2}$$

$$1.5 < x_2'/x_1' < 7.5 \tag{3}$$

$$0.45 < x_3'/x_1' < 2.7 \tag{4}$$

where $x_1'$ is the amount of movement of said first lens unit (G1) from its reference position in the shortest focal length condition when focused to an object lying at a shorter distance than a normal close range, $x_2'$ is the amount of movement of said second lens unit (G2) for focusing, $x_3'$ is the amount of movement of said third lens unit (G3) for focusing, $f_1$, $f_2$ and $f_3$ are the focal lengths of said first lens unit (G1), said second lens unit (G2) and said third lens unit (G3), respectively.

2. A zoom lens system according to claim 1, wherein said first lens unit (G1) has, in succession from the object side, an achromatic cemented positive lens ($L_{11}$) and a positive meniscus lens ($L_{12}$), said second lens unit (G2) has, in succession from the object side, a negative lens ($L_{21}$), a negative lens ($L_{22}$) and a positive meniscus lens ($L_{23}$), and said third lens unit (G3) has a negative achromatic cemented lens or a negative meniscus single lens ($L_{31}$).

3. A zoom lens system according to claim 2, further satisfying the following conditions:

$$2.2 < (r_b + r_a)/(r_b - r_a) < 2.8 \tag{5}$$

$$1.4 < |f_{rc}/f_{11}| < 1.8 \tag{6}$$

$$0.7 < r_d/|f_{21}| < 0.8 \tag{7}$$

$$1.1 < f_{re}/f_{23} < 1.6 \tag{8}$$

$$1.7 < (r_g + r_f)/(r_g - r_f) < 2.8 \tag{9}$$

where $r_a$: radius of curvature of the surface of the cemented positive lens ($L_{11}$) in said first lens unit (G1) which is adjacent to the object side $r_b$: radius of curvature of the surface of said cemented positive lens ($L_{11}$) in said first lens unit (G1) which is adjacent to the image side $f_{rc}$: focal length of the cemented surface of said cemented positive lens ($L_{11}$) in said first lens unit (G1)

$f_{11}$: composite focal length of said cemented positive lens ($L_{11}$) in said first lens unit (G1)

$r_d$: radius of curvature of the surface of the object side negative lens ($L_{21}$) in said second lens unit (G2) which is adjacent to the image side $f_{21}$: focal length of the object side negative lens ($L_{21}$) in said second lens unit (G2)

$f_{re}$: focal length of the surface of the positive meniscus lens ($L_{23}$) in said second lens unit (G2)

$f_{23}$: focal length of said positive meniscus lens ($L_{23}$) in said second lens unit (G2)

$r_f$: radius of curvature of the surface of the negative lens ($L_{31}$) in said third lens unit (G3) which is adjacent to the object side $r_g$: radius of curvature of the surface of said negative lens ($L_{31}$) in said third lens unit which is adjacent to the image side.

4. A zoom lens system according to claim 3, wherein numerical data are as follows:

Total focal length of the entire system: f: 50.0–135.0
Angle of view: $2\omega$ = 48.6°–17.6° F-number: 3.5

| | | | | | |
|---|---|---|---|---|---|
| G1 | $r_1$ = 120.000 | $d_1$ = 1.752 | $n_1$ = 1.80518 | $\nu_1$ = 25.5 | $L_{11}$ |
| | $r_2$ = 55.327 | $d_2$ = 8.000 | $n_2$ = 1.67790 | $\nu_2$ = 55.5 | |
| | $r_3$ = 280.500 | $d_3$ = 0.103 | | | |
| | $r_4$ = 70.672 | $d_4$ = 5.200 | $n_3$ = 1.67003 | $\nu_3$ = 47.2 | $L_{12}$ |
| | $r_5$ = 475.687 | $d_5$ = variable | | | |
| G2 | $r_6$ = −628.760 | $d_6$ = 1.290 | $n_4$ = 1.69680 | $\nu_4$ = 55.6 | $L_{21}$ |
| | $r_7$ = 22.563 | $d_7$ = 4.566 | | | |
| | $r_8$ = −266.087 | $d_8$ = 1.191 | $n_5$ = 1.65830 | $\nu_5$ = 57.3 | $L_{22}$ |
| | $r_9$ = 73.045 | $d_9$ = 0.496 | | | |
| | $r_{10}$ = 32.767 | $d_{10}$ = 2.978 | $n_6$ = 1.80518 | $\nu_6$ = 25.5 | $L_{23}$ |
| | $r_{11}$ = 102.146 | $d_{11}$ = variable | | | |
| G3 | $r_{12}$ = −45.846 | $d_{12}$ = 0.600 | $n_7$ = 1.67025 | $\nu_7$ = 57.5 | $L_{31}$ |
| | $r_{13}$ = 104.000 | $d_{13}$ = 3.200 | $n_8$ = 1.62230 | $\nu_8$ = 53.1 | |
| | $r_{14}$ = −103.464 | $d_{14}$ = variable | | | |
| G4 | $r_{15}$ = 87.999 | $d_{15}$ = 4.502 | $n_9$ = 1.62299 | $\nu_9$ = 58.1 | $L_{41}$ |
| | $r_{16}$ = −54.817 | $d_{16}$ = 0.100 | | | |
| | $r_{17}$ = 29.301 | $d_{17}$ = 6.503 | $n_{10}$ = 1.52000 | $\nu_{10}$ = 70.1 | $L_{42}$ |
| | $r_{18}$ = −62.753 | $d_{18}$ = 2.001 | $n_{11}$ = 1.79504 | $\nu_{11}$ = 28.4 | |
| | $r_{19}$ = 139.868 | $d_{19}$ = 25.507 | | | |

-continued

|  |  |  |  |
|---|---|---|---|
| $r_{20} = -17.098$ | $d_{20} = 2.000$ | $n_{12} = 1.67003$  $\nu_{12} = 47.2$ | $L_{43}$ |
| $r_{21} = -26.311$ | $d_{21} = 0.100$ |  |  |
| $r_{22} = -1064.000$ | $d_{22} = 4.000$ | $n_{13} = 1.62280$  $\nu_{13} = 56.9$ | $L_{44}$ |
| $r_{23} = -53.091$ |  |  |  |

|  | $f = 50.0$ | $f = 135.0$ | Close range photography ($R = 0.6$ m) |
|---|---|---|---|
| $d_5$ | 1.762 | 37.798 | 6.450 |
| $d_{11}$ | 32.445 | 3.146 | 35.681 |
| $d_{14}$ | 7.286 | 0.550 | 9.050 |
| Back focal length | 40.454 | 40.454 | 40.454 | where $r_1, r_2, r_3, \ldots$, represent the radii of curvature of the successive lens surfaces from the object side, $d_1, d_2, d_3, \ldots$, represent the center thicknesses and air spaces of the respective lenses, $n_1, n_2, n_3, \ldots$, represent the refractive indices of the respective lenses, and $\nu_1, \nu_2, \nu_3, \ldots$, represent the Abbe numbers of the respective lenses.

5. A zoom lens system according to claim 3, wherein numerical data are as follows:

Total focal length: $f = 50.0$–135.0
Angle of view: $2\omega = 48.6°$–$17.6°$ F-number: 3.5

| | | | | | |
|---|---|---|---|---|---|
| G1 | $r_1 = 119.700$ | $d_1 = 1.750$ | $n_1 = 1.80518$ | $\nu_1 = 25.5$ | $L_{11}$ |
| | $r_2 = 55.250$ | $d_2 = 8.000$ | $n_2 = 1.67790$ | $\nu_2 = 55.5$ | |
| | $r_3 = 290.506$ | $d_3 = 0.100$ | | | |
| | $r_4 = 71.202$ | $d_4 = 5.200$ | $n_3 = 1.66672$ | $\nu_3 = 48.4$ | $L_{12}$ |
| | $r_5 = 480.487$ | $d_5 =$ variable | | | |
| G2 | $r_6 = -679.158$ | $d_6 = 1.300$ | $n_4 = 1.69680$ | $\nu_4 = 55.6$ | $L_{21}$ |
| | $r_7 = 22.576$ | $d_7 = 4.550$ | | | |
| | $r_8 = -260.766$ | $d_8 = 1.200$ | $n_5 = 1.65830$ | $\nu_5 = 57.3$ | $L_{22}$ |
| | $r_9 = 72.886$ | $d_9 = 0.500$ | | | |
| | $r_{10} = 32.797$ | $d_{10} = 3.200$ | $n_6 = 1.80518$ | $\nu_6 = 25.5$ | $L_{23}$ |
| | $r_{11} = 102.552$ | $d_{11} =$ variable | | | |
| G3 | $r_{12} = -49.062$ | $d_{12} = 1.200$ | $n_7 = 1.67025$ | $\nu_7 = 57.5$ | $L_{31}$ |
| | $r_{13} = -140.757$ | $d_{13} =$ variable | | | |
| G4 | $r_{14} = 520.300$ | $d_{14} = 3.200$ | $n_8 = 1.62230$ | $\nu_8 = 53.1$ | $L_{41}$ |
| | $r_{15} = -47.860$ | $d_{15} = 0.100$ | | | |
| | $r_{16} = 37.413$ | $d_{16} = 6.000$ | $n_9 = 1.51454$ | $\nu_9 = 54.6$ | $L_{42}$ |
| | $r_{17} = 765.579$ | $d_{17} = 0.100$ | | | |
| | $r_{18} = 24.293$ | $d_{18} = 5.500$ | $n_{10} = 1.51823$ | $\nu_{10} = 59.0$ | $L_{43}$ |
| | $r_{19} = -248.661$ | $d_{19} = 2.000$ | $n_{11} = 1.79504$ | $\nu_{11} = 28.4$ | |
| | $r_{20} = 28.696$ | $d_{20} = 35.000$ | | | |
| | $r_{21} = -17.690$ | $d_{21} = 2.000$ | $n_{12} = 1.67003$ | $\nu_{12} = 47.2$ | $L_{44}$ |
| | $r_{22} = -24.516$ | $d_{22} = 0.100$ | | | |
| | $r_{23} = 248.760$ | $d_{23} = 4.500$ | $n_{13} = 1.62280$ | $\nu_{13} = 56.9$ | $L_{45}$ |
| | $r_{24} = -58.913$ | | | | |

|  | $f = 50.0$ | $f = 135.0$ | Close range photography ($R = 0.6$ m) |
|---|---|---|---|
| $d_5$ | 1.708 | 37.706 | 6.488 |
| $d_{11}$ | 32.697 | 3.338 | 35.699 |
| $d_{13}$ | 9.198 | 2.559 | 10.997 |
| Back focal length | 40.073 | 40.073 | 40.073 | where $r_1, r_2, r_3, \ldots$, represent the radii of curvature of the successive lens surfaces from the object side, $d_1, d_2, d_3, \ldots$, represent the center thicknesses and air spaces of the respective lenses, $n_1, n_2, n_3, \ldots$, represent the refractive indices of the respective lenses, and $\nu_1, \nu_2, \nu_3, \ldots$, represent the Abbe numbers of the respective lenses.

6. A zoom lens system according to claim 3, wherein numerical data are as follows:

Total focal length: $f = 51.35$–131.5
Angle of view: $2\omega = 47.2°$–$18.1°$ F-number: 3.5

| | | | | | |
|---|---|---|---|---|---|
| G1 | $r_1 = 109.108$ | $d_1 = 1.700$ | $n_1 = 1.80518$ | $\nu_1 = 25.5$ | $L_{11}$ |
| | $r_2 = 52.045$ | $d_2 = 7.700$ | $n_2 = 1.67790$ | $\nu_2 = 55.5$ | |
| | $r_3 = 271.045$ | $d_3 = 0.100$ | | | |
| | $r_4 = 73.746$ | $d_4 = 5.000$ | $n_3 = 1.66672$ | $\nu_3 = 48.4$ | $L_{12}$ |
| | $r_5 = 669.887$ | $d_5 =$ variable | | | |
| G2 | $r_6 = -596.840$ | $d_6 = 1.250$ | $n_4 = 1.69680$ | $\nu_4 = 55.6$ | $L_{21}$ |
| | $r_7 = 23.177$ | $d_7 = 5.000$ | | | |
| | $r_8 = -187.747$ | $d_8 = 1.150$ | $n_5 = 1.78797$ | $\nu_5 = 47.5$ | $L_{22}$ |
| | $r_9 = 80.762$ | $d_9 = 0.500$ | | | |
| | $r_{10} = 36.040$ | $d_{10} = 3.100$ | $n_6 = 1.80518$ | $\nu_6 = 25.5$ | $L_{23}$ |

-continued

|  | | | | |
|---|---|---|---|---|
| | $r_{11} = 178.634$ | $d_{11}$ = variable | | |
| | $r_{12} = -48.836$ | $d_{12} = 1.150$ | $n_7 = 1.67025$ $\nu_7 = 57.5$ | |
| G3 | $r_{13} = 88.471$ | $d_{13} = 2.950$ | $n_8 = 1.67163$ $\nu_8 = 38.8$ | $L_{31}$ |
| | $r_{14} = -145.230$ | $d_{14}$ = variable | | |
| | $r_{15} = 644.641$ | $d_{15} = 3.25$ | $n_9 = 1.62041$ $\nu_9 = 60.35$ | $L_{41}$ |
| | $r_{16} = -54.649$ | $d_{16} = 0.100$ | | |
| | $r_{17} = 39.937$ | $d_{17} = 6.100$ | $n_{10} = 1.51823$ $\nu_{10} = 59.0$ | $L_{42}$ |
| | $r_{18} = -366.908$ | $d_{18} = 0.100$ | | |
| | $r_{19} = 22.847$ | $d_{19} = 5.600$ | $n_{11} = 1.51823$ $\nu_{11} = 59.0$ | $L_{43}$ |
| G4 | $r_{20} = -274.443$ | $d_{20} = 2.000$ | $n_{12} = 1.79504$ $\nu_{12} = 28.4$ | |
| | $r_{21} = 27.085$ | $d_{21} = 35.550$ | | |
| | $r_{22} = -17.440$ | $d_{22} = 2.000$ | $n_{13} = 1.67003$ $\nu_{13} = 47.2$ | $L_{44}$ |
| | $r_{23} = -23.786$ | $d_{23} = 0.100$ | | |
| | $r_{24} = 119.773$ | $d_{24} = 4.550$ | $n_{14} = 1.61720$ $\nu_{14} = 54.0$ | $L_{45}$ |
| | $r_{25} = -81.958$ | | | |

| | f = 51.4 | f = 131.5 | Close range photography (R = 0.6 m) |
|---|---|---|---|
| $d_5$ | 3.496 | 35.967 | 7.276 |
| $d_{11}$ | 27.945 | 3.069 | 31.396 |
| $d_{14}$ | 9.661 | 2.065 | 11.510 |
| Back focal length | 40.003 | 40.003 | 40.003 | where $r_1, r_2, r_3, \ldots$, represent the radii of curvature of the successive lens surfaces from the object side, $d_1, d_2, d_3, \ldots$, represent the center thicknesses and air spaces of the respective lenses, $n_1, n_2, n_3, \ldots$, represent the refractive indices of the respective lenses, and $\nu_1, \nu_2, \nu_3, \ldots$, represent the Abbe numbers of the respective lenses.

7. A zoom lens system according to claim 3, wherein numerical data are as follows:

Total focal length: f = 50.0–135.0
Angle of view: $2\omega$ = 48.4°–17.5° F-number: 3.5

|  | | | | |
|---|---|---|---|---|
| | $r_1 = 117.081$ | $d_1$ 1.750 | $n_1 = 1.80518$ $\nu_1 = 25.5$ | $L_{11}$ |
| | $r_2 = 54.849$ | $d_2 = 8.000$ | $n_2 = 1.67790$ $\nu_2 = 55.5$ | |
| G1 | $r_3 = 282.548$ | $d_3 = 0.100$ | | |
| | $r_4 = 72.149$ | $d_4 = 5.200$ | $n_3 = 1.66672$ $\nu_3 = 48.4$ | $L_{12}$ |
| | $r_5 = 501.276$ | $d_5$ = variable | | |
| | $r_6 = -651.355$ | $d_6 = 1.300$ | $n_4 = 1.69680$ $\nu_4 = 55.6$ | $L_{21}$ |
| | $r_7 = 22.627$ | $d_7 = 4.550$ | | |
| | $r_8 = -236.588$ | $d_8 = 1.200$ | $n_5 = 1.65830$ $\nu_5 = 57.3$ | $L_{22}$ |
| G2 | $r_9 = 73.295$ | $d_9 = 0.500$ | | |
| | $r_{10} = 33.063$ | $d_{10} = 3.200$ | $n_6 = 1.80518$ $\nu_6 = 25.5$ | $L_{23}$ |
| | $r_{11} = 107.604$ | $d_{11}$ = variable | | |
| G3 | $r_{12} = -49.390$ | $d_{12} = 1.200$ | $n_7 = 1.67025$ $\nu_7 = 57.5$ | $L_{31}$ |
| | $r_{13} = -143.455$ | $d_{13}$ = variable | | |
| | $r_{14} = 302.318$ | $d_{14} = 3.200$ | $n_8 = 1.71700$ $\nu_8 = 47.9$ | $L_{41}$ |
| | $r_{15} = -56.420$ | $d_{15} = 0.100$ | | |
| | $r_{16} = 42.090$ | $d_{16} = 5.000$ | $n_9 = 1.57250$ $\nu_9 = 46.2$ | $L_{42}$ |
| | $r_{17} = -91.578$ | $d_{17} = 1.000$ | $n_{10} = 1.79631$ $\nu_{10} = 40.8$ | |
| | $r_{18} = 282.945$ | $d_{18} = 0.100$ | | |
| | $r_{19} = 25.063$ | $d_{19} = 5.500$ | $n_{11} = 1.51823$ $\nu_{11} = 59.0$ | $L_{43}$ |
| | $r_{20} = -457.824$ | $d_{20} = 1.000$ | | |
| G4 | $r_{21} = -361.839$ | $d_{21} = 2.000$ | $n_{12} = 1.79504$ $\nu_{12} = 28.4$ | $L_{44}$ |
| | $r_{22} = 30.961$ | $d_{22} = 10.000$ | | |
| | $r_{23} = 165.161$ | $d_{23} = 3.000$ | $n_{13} = 1.51680$ $\nu_{13} = 64.2$ | $L_{45}$ |
| | $r_{24} = -133.734$ | $d_{24} = 19.764$ | | |
| | $r_{25} = -17.944$ | $d_{25} = 2.000$ | $n_{14} = 1.67003$ $\nu_{14} = 47.2$ | $L_{46}$ |
| | $r_{26} = -26.804$ | $d_{26} = 0.100$ | | |
| | $r_{27} = -180.359$ | $d_{27} = 4.500$ | $n_{15} = 1.66755$ $\nu_{15} = 41.9$ | $L_{47}$ |
| | $r_{28} = -49.376$ | | | |

| | f = 50.0 | f = 135.0 | Close range photography (R = 0.6 m) |
|---|---|---|---|
| $d_5$ | 1.673 | 37.672 | 6.353 |
| $d_{11}$ | 32.651 | 3.292 | 35.910 |
| $d_{13}$ | 9.207 | 2.567 | 10.948 |
| Back focal length | 40.000 | 40.000 | 40.000 | where $r_1, r_2, r_3, \ldots$, represent the radii of curvature of the successive lens surfaces from the object side, $d_1, d_2, d_3, \ldots$, represent the center thicknesses and air spaces of the respective lenses, $n_1, n_2, n_3, \ldots$, represent the refractive indices of the respective lenses, and $\nu_1, \nu_2, \nu_3, \ldots$, represent the Abbe numbers of the respective lenses.

* * * * *